United States Patent
Rouvinen (10) Patent No.: US 11,463,474 B2
(45) Date of Patent: Oct. 4, 2022

(54) DEFEND AGAINST DENIAL OF SERVICE ATTACK

(71) Applicant: AIRO FINLAND OY, Helsinki (FI)

(72) Inventor: Jarmo Tapio Rouvinen, Helsinki (FI)

(73) Assignee: AIRO FINLAND OY, Helsinki (FI)

( * ) Notice: Subject to any disclaimer, the term of this patent is extended or adjusted under 35 U.S.C. 154(b) by 223 days.

(21) Appl. No.: 16/616,486

(22) PCT Filed: Jun. 7, 2017

(86) PCT No.: PCT/FI2017/050421
§ 371 (c)(1),
(2) Date: Nov. 24, 2019

(87) PCT Pub. No.: WO2018/224720
PCT Pub. Date: Dec. 13, 2018

(65) Prior Publication Data
US 2020/0177625 A1 Jun. 4, 2020

(51) Int. Cl.
H04L 9/40 (2022.01)
(52) U.S. Cl.
CPC ...... H04L 63/1458 (2013.01); H04L 63/1425 (2013.01)
(58) Field of Classification Search
CPC .................. H04L 63/1458; H04L 63/1425
See application file for complete search history.

(56) References Cited

U.S. PATENT DOCUMENTS

| | | | | |
|---|---|---|---|---|
| 8,819,285 B1 * | 8/2014 | Wilkinson | .......... | H04L 63/1441 726/23 |
| 8,832,831 B2 * | 9/2014 | Chesla | ............... | H04L 63/1416 713/168 |
| 9,088,581 B2 * | 7/2015 | Strebe | ................... | H04L 63/126 |
| 9,276,907 B1 * | 3/2016 | Mihelich | ............... | H04L 47/125 |
| 9,282,113 B2 * | 3/2016 | Vaughan | ............ | H04L 63/1458 |
| 9,350,758 B1 * | 5/2016 | Aharoni | ................ | G06F 21/577 |
| 9,396,330 B2 * | 7/2016 | Muthiah | ............ | H04L 61/1511 |
| 9,444,785 B2 * | 9/2016 | Jungck | ................ | H04L 63/1458 |
| 9,641,561 B2 * | 5/2017 | Larkin | ................ | H04L 65/1069 |

(Continued)

OTHER PUBLICATIONS

International Search Report and Written Opinion for PCT/FI2017/050421 dated Feb. 2, 2018.

(Continued)

Primary Examiner — Joseph P Hirl
Assistant Examiner — Stephen T Gundry
(74) Attorney, Agent, or Firm — Thomas | Horstemeyer, LLP (57) ABSTRACT

The invention relates to a method for defending against a Denial of Service attack, the method comprises: monitoring data traffic; detecting that at least one source computer is involved in a Denial of Service attack; in response to the detection generating at least one data frame by modifying at least one data frame obtained from the data traffic transmitted from the at least one source computer so that a plurality of data fields representing address information of the host server as a source of the at least one generated data frame are set to correspond to address information of the at least one source computer; transmitting the generated data frame to the source computer. The invention relates also to a network device and a computer program product.

11 Claims, 3 Drawing Sheets

(56) References Cited

U.S. PATENT DOCUMENTS

| | | | |
|---|---|---|---|
| 9,654,501 B1* | 5/2017 | Ast | H04L 63/1416 |
| 9,749,340 B2* | 8/2017 | Huston, III | H04L 63/1458 |
| 10,097,578 B2* | 10/2018 | Baldonado | H04L 63/1425 |
| 10,110,627 B2* | 10/2018 | St. Pierre | H04L 63/1458 |
| 10,116,692 B2* | 10/2018 | Huston, III | H04L 63/0428 |
| 10,542,006 B2* | 1/2020 | Chien | H04L 45/745 |
| 2007/0140121 A1* | 6/2007 | Bowman | H04L 63/101 |
| | | | 370/230 |
| 2008/0127324 A1* | 5/2008 | Seo | H04L 63/1458 |
| | | | 726/13 |
| 2008/0263666 A1 | 10/2008 | Keohane | |
| 2010/0122342 A1* | 5/2010 | El-Moussa | H04L 63/1458 |
| | | | 726/22 |
| 2012/0151583 A1* | 6/2012 | Kang | H04L 63/1458 |
| | | | 726/23 |
| 2014/0215599 A1* | 7/2014 | Demopoulos | G06F 21/554 |
| | | | 726/13 |
| 2015/0067840 A1* | 3/2015 | Xiang | H04L 5/0055 |
| | | | 726/22 |
| 2015/0150123 A1* | 5/2015 | Be'ery | H04L 41/0686 |
| | | | 726/22 |
| 2016/0164896 A1* | 6/2016 | Baldonado | H04L 63/1458 |
| | | | 726/23 |
| 2016/0323299 A1* | 11/2016 | Huston, III | H04L 63/1416 |
| 2016/0357424 A1* | 12/2016 | Pang | G06F 16/24578 |
| 2017/0063799 A1* | 3/2017 | Larson | H04L 61/2007 |
| 2017/0126709 A1* | 5/2017 | Baradaran | H04L 63/1416 |
| 2018/0063187 A1* | 3/2018 | St. Pierre | H04L 63/1433 |
| 2018/0131718 A1* | 5/2018 | Chien | H04L 63/101 |
| 2018/0145986 A1* | 5/2018 | Chien | H04L 45/745 |
| 2018/0183831 A1* | 6/2018 | Amin | H04L 63/0236 |
| 2018/0262467 A1* | 9/2018 | Jayawardena | H04L 63/0236 |

OTHER PUBLICATIONS

Yu-Xi Lim, et al. "Wireless intrusion detection and response," Information Assurance Workshop, 2003, IEEE Systems, Man and Cybernetics Society, Jun. 18-20, 2003, pp. 68-75.

* cited by examiner

|  | Received frame | Normal frame to be returned | Modified frame |
|---|---|---|---|
| *Source MAC address* | Router 320 MAC address | Host server 201 MAC address | Router 320 MAC address |
| *Destination MAC address* | Host server 201 MAC address | Router 320 MAC address | Router 320 MAC address |
| *Source IP address* | Source computer 207 IP address | Host server 201 IP address | Source computer 207 IP address |
| *Destination IP address* | Host server 201 IP address | Source computer 207 IP address | Source computer 207 IP address |
| *Source Port identifier* | Source computer 207 Port identifier | Host server 201 Port idenfier | Source computer 207 Port identifier |
| *Destination Port identifier* | Host server 201 Port idenfier | Source computer 207 Port identifier | Source computer 207 Port identifier |

FIGURE 5A

|  | Received frame | Normal frame to be returned | *Modified frame* |
|---|---|---|---|
| *Source MAC address* | Router 320 MAC address | Host server 201 MAC address | Host Server 201 MAC address |
| *Destination MAC address* | Host server 201 MAC address | Router 320 MAC address | Router 320 MAC address |
| *Source IP address* | Source computer 207 IP address | Host server 201 IP address | Source computer 207 IP address |
| *Destination IP address* | Host server 201 IP address | Source computer 207 IP address | Source computer 207 IP address |
| *Source Port identifier* | Source computer 207 Port identifier | Host server 201 Port idenfier | Source computer 207 Port identifier |
| *Destination Port identifier* | Host server 201 Port idenfier | Source computer 207 Port identifier | Source computer 207 Port identifier |

FIGURE 5B

|  | Received frame | Normal frame to be returned | *Modified frame* |
|---|---|---|---|
| *Source MAC address* | Router 320 MAC address | Host server 201 MAC address | Unique MAC (not host server) |
| *Destination MAC address* | Host server 201 MAC address | Router 320 MAC address | Router 320 MAC address |
| *Source IP address* | Source computer 207 IP address | Host server 201 IP address | Source computer 207 IP address |
| *Destination IP address* | Host server 201 IP address | Source computer 207 IP address | Source computer 207 IP address |
| *Source Port identifier* | Source computer 207 Port identifier | Host server 201 Port idenfier | Source computer 207 Port identifier |
| *Destination Port identifier* | Host server 201 Port idenfier | Source computer 207 Port identifier | Source computer 207 Port identifier |

FIGURE 5C

DEFEND AGAINST DENIAL OF SERVICE ATTACK

CROSS-REFERENCE TO RELATED APPLICATIONS

This application is the 35 U.S.C. § 371 national stage application of PCT Application No. PCT/FI2017/050421, filed Jun. 7, 2017, which is herein incorporated by reference in its entirety.

TECHNICAL FIELD

The invention concerns in general the technical field of communication networks. More particularly, the invention concerns a solution for protecting the communication networks against service attacks.

BACKGROUND

Communication in today's world is heavily based on communications networks. The development in the area of the communications networks has been tremendous especially during the past decades. However, the more important the communications networks have become the more attractive targets they are for criminals. One more and more common abuse in the communications network is so called Denial of Service attack (DoS). The denial of service attack is an attempt to prevent or to impair a legitimate use of a service in the communications network. Typically, the services are implemented in a manner that there is a so called host computer coupled to the communications network. The host computer is configured to maintain and host, i.e. provide, the service to the public, or limited number of people. Now, the criminals may, by arranging an attack against the host computer, prevent or at least impair the availability of a legitimate service. The host computer in this context shall be understood to cover a personal computer, a router, a firewall, a server, a server farm, a network or the like.

A typical way to arrange the attack against the host computer is to launch the attack from a device or system coupled to the Internet towards to the host computer. The denial of service attack comprises several sub-types but one common method of attack involves saturating the host computer with external communication requests. As a result, the host computer cannot respond to legitimate traffic, or responds so slowly, that the service can, in practice, be considered as being unavailable.

Naturally, there have been developed several ways to defend against DoS attacks. The defense can e.g. be based on so called firewall solutions, switch or router solutions, application front end hardware solutions or IPS (Intrusion-prevention systems) based prevention among others. The firewall solutions are typically based on an idea to allow or deny traffic under predetermined conditions, such as based on protocols, ports or IP addresses. The switch and router solutions are normally based on rate limiting solutions, wherein the traffic activity is monitored and based on that e.g. filtering to the data traffic can be made. Further, the application front end hardware solutions are based on an idea that some intelligent hardware is placed on the network before traffic reaches the host computers. The application front end hardware is configured to analyze data packets as they enter the system and to filter them accordingly. IPS based prevention, in turn, is based on an idea of utilizing signatures for recognizing the content.

The most common set of communication protocols used in Internet and similar communication networks is so called Internet protocol suite. It is commonly referred as TCP/IP (Transmission Control Protocol/Internet Protocol), because of its most important protocols TCP and IP. The Internet protocol suite provides end-to-end connectivity and it describes how data shall be formatted, addressed, transmitted, routed and received at the destination. The Internet protocol suite uses so called encapsulation to provide abstraction of protocols and services. The encapsulation is achieved by arranging different layers for different purposes in the Internet protocol suite. The layers are application layer, transport layer, network layer and link layer. The scope of the application layer is to enable communication of user data created by the applications to other processes or applications. The application layer is also referred by process-to-process communication. The transport layer is dedicated to host-to-host communication, which refers to end-to-end message transfer independently of the underlying network, along with error control, segmentation, flow control, congestion control and application addressing. The end-to-end message transmission or connecting applications at the transport layer can be categorized as either connection-oriented, implemented in TCP, or connectionless, implemented in UDP (User Datagram Protocol). The network layer, in turn, has the responsibility of sending data packets across potentially multiple networks. The inter-networking requires sending data from the source network to the destination network, which is also known as routing. In the Internet protocol suite the Internet protocol performs two basic functions for the routing i.e. host addressing and identification and packet routing. The link layer is the networking scope of the local network connection to which a host is attached. The link layer is used to move data packets between the Internet layer interfaces of two different hosts on the same link.

Figure 1:
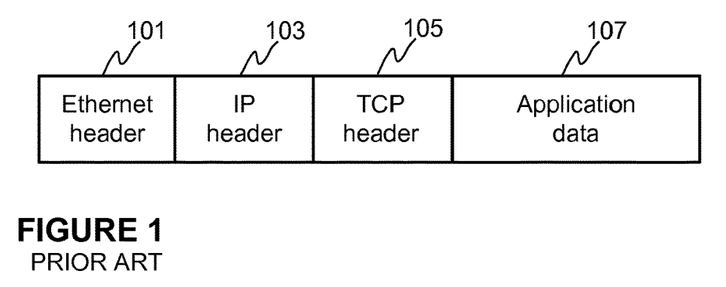
FIG. 1 illustrates schematically a TCP packet structure.

As already mentioned the Internet protocol suite is based on the concept of encapsulation. This means that each layer in the protocol stack adds information to the data with header information. Thus, the user data is encapsulated to application data 107 into which a TCP header 105 is added, next the IP header 103 is added and finally Ethernet headers 101. The structure is illustrated in the FIG. 1. The structure does not illustrate any trailer information, such as Ethernet trailer at the end of the message structure. FIG. 1 illustrates the packet structure in case of TCP/IP, but a similar structure can also be drawn for UDP.

Figure 2:
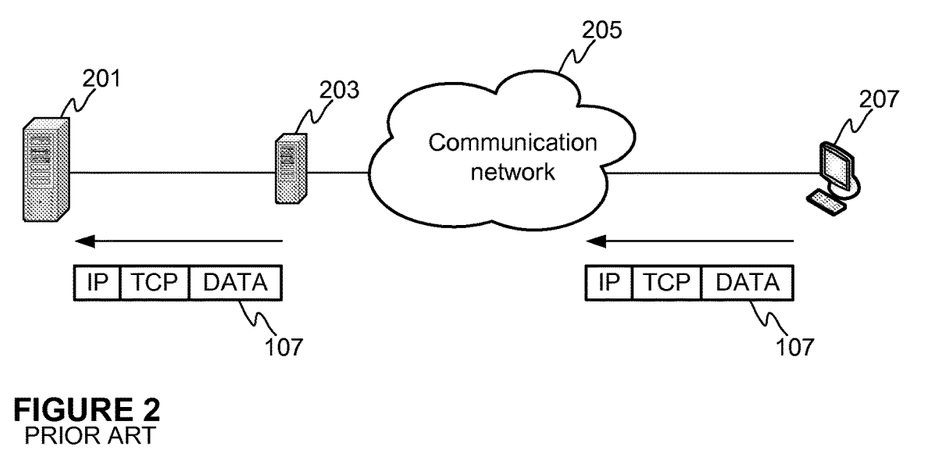
FIG. 2 illustrates schematically an example of a prior art solution against DoS attack.

In FIG. 2 it is illustrated prior art solution against DoS attack, which is implemented by means of firewall. The FIG. 2 illustrates the following elements: host server 201, front-end computer 203 performing firewall operations, communication network 205, such as Internet, and source computer (attacker) 207. For clarity reasons only one source computer is illustrated, but the number of source computers may vary and typically the DoS attacks are originating from multiple source computers 207 in order to achieve the destructive effect. This kind of attack is specifically called as Distributed Denial of Service (DDoS) attacks. The source computer 207 sends DoS data in a protocol structure complying the TCP/IP encapsulation. The DoS data is encapsulated in the application data 107 field. Now, as the state of the art DoS firewall solutions are configured to examine for example the protocol structure or IP address, the firewall does not detect that the application data contains DoS data, since the data packet seems to comply all requirements in the TCP/IP communication. Thus, the denial of service attack cannot be prevented with the prior art solutions.

A further aspect with respect to TCP protocol is the way of operation of it. The first communication from a source starts with so called TCP SYN packet, which comprises the address of the sender and the destination address of the recipient. The first communication reaches the front-end computer, which maintains firewall operations. The firewall is configured to read the destination address of the data packet from the received communication and on a basis of that to initiate the communication connection to the destination address, i.e. to the host computer, with TCP SYN frame. The host computer responds to the firewall with TCP ACK SYN frame with its own address and the destination address, i.e. firewall address. The firewall acknowledges this back to the host computer with TCP ACK frame. As a result, the communication connection is established between the host computer and the firewall.

The firewall is also configured to respond to the source computer with a TCP ACK SYN frame with at least the recipient's address as well as the its own address when the firewall is implemented in a typical way. The own address is a so called NAT-IP address (Network Address Translation).

The source computer acknowledges with TCP ACK packet to the firewall. As a result, the communication connection is established between the firewall and the source computer.

Further, the ACK packets, i.e. TCP ACK SYN and TCP ACK, as described above comprise ACK counter information, which carries information how much each of the party of the communication connection has received application data in bytes. The start value for the ACK counters of each party is defined in the TCP SYN and TCP ACK SYN frames. In addition, the status of the amount of the received application data for each of the parties is maintained in the counters. The counter information representing the total amount of data sent by the party is maintained in a Sequence Number field in the TCP frame.

After the above described handshake procedure the communication can be started in both communication connections through the firewall, which monitors and maintains the connection between the source computer and the host computer. In the worst case, the DoS data may reach the target through the communication connection, as the firewall only has checked that the protocols and their frame structures are correct.

Even if there exist solutions to control, at least to some extent, the DoS attacks there is need to develop new solutions in the area and which may at least in part solve drawbacks of the existing solutions.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a method, a network device and a computer program product for defending against a Denial of Service attack.

The objectives of the invention are reached by a method, a network device and a computer program product as defined by the respective independent claims.

According to a first aspect, a method for defending against a Denial of Service attack is provided, the method comprises: monitoring data traffic transmitted from at least one source computer to a host server; detecting that the at least one source computer transmitting data is involved in a Denial of Service attack; in response to the detection that the at least one source computer is involved in the Denial of Service attack generating at least one data frame by modifying at least one data frame obtained from the data traffic transmitted from the at least one source computer being involved in the Denial of Service attack so that a plurality of data fields in the generated at least one data frame representing address information of the host server as a source of the at least one generated data frame are set to correspond to address information of the at least one source computer being involved in the Denial of Service attack; transmitting the generated data frame to the source computer.

The plurality of the data fields may comprise at least the following: a source network address, local end point specific identifier of the source. The at least one data frame may comprise a data field representing a device-specific address of the source, the data field is set to correspond to one of the following: a device-specific address of a routing device receiving the data traffic from the at least one source computer; a unique device-specific address deviating from a device-specific address of the host server.

The generation of the at least one data frame may further comprise a modification of a sequence number of a source sequence number to correspond to a received sequence number obtained from the data frame obtained from the data traffic.

Moreover, the generation of the at least one data frame may further comprises a modification of an acknowledgement number of a source acknowledgement number to correspond to a received acknowledgement number obtained from the data frame obtained from the data traffic.

The detection that the at least one source computer transmitting data is involved in a Denial of Service attack may be based on at least one predetermined rule. The at least one predetermined rule may be based on at least one of the following: utilization rate of a data connection, inactivation of data connection within a predetermined period of time, a direction of the data traffic, a number of destinations of the data traffic, detection of used protocols and TCP/UDP port numbers in the data traffic.

According to a second aspect, a network device for defending against a Denial of Service attack is provided, the network device comprises: at least one processor; at least one memory including computer program code; the at least one memory and the computer program code configured to, with the at least one processor, cause the network device to perform: monitor data traffic transmitted from at least one source computer to a host server; detect that the at least one source computer transmitting data is involved in a Denial of Service attack; in response to the detection that the at least one source computer is involved in the Denial of Service attack generate at least one data frame by modifying at least one data frame obtained from the data traffic transmitted from the at least one source computer being involved in the Denial of Service attack so that a plurality of data fields in the generated at least one data frame representing address information of the host server as a source of the at least one generated data frame are set to correspond to address information of the at least one source computer being involved in the Denial of Service attack; transmit the generated data frame to the source computer.

The network device may be configured to set the following plurality of the data fields to correspond to address information of the at least one source computer: a source network address, local end point specific identifier of the source. The network device may further be configured to modify a data field representing a device-specific address of the source so that the data field is set to correspond to one of the following: a device-specific address of a routing device receiving the data traffic from the at least one source computer; a unique device-specific address deviating from a device-specific address of the host server.

Moreover, the network device may further be configured to modify a sequence number of a source sequence number to correspond to a received sequence number obtained from the data frame obtained from the data traffic during the generation of the at least one data frame.

The network device may further be configured to modify an acknowledgement number of a source acknowledgement number to correspond to a received acknowledgement number obtained from the data frame obtained from the data traffic during the generation of the at least one data frame.

The network device may be configured to perform the detection that the at least one source computer transmitting data is involved in a Denial of Service attack based on at least one predetermined rule. The network device may also be configured to base the at least one predetermined rule on at least one of the following: utilization rate of a data connection, inactivation of data connection within a predetermined period of time, a direction of the data traffic, a number of destinations of the data traffic, detection of used protocols and TCP/UDP port numbers in the data traffic.

According to a third aspect, a computer program product is provided, the computer program product comprising at least one computer-readable storage medium having computer-executable program code instructions stored therein for performing the method as described above when the computer program product is executed on a computer.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

FIG. 3 illustrates schematically a non-limiting example of a communication environment in which an example of the present invention is implemented to.

FIG. 5A-5C illustrate schematically examples of content included in a certain data fields of data frame.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 3:
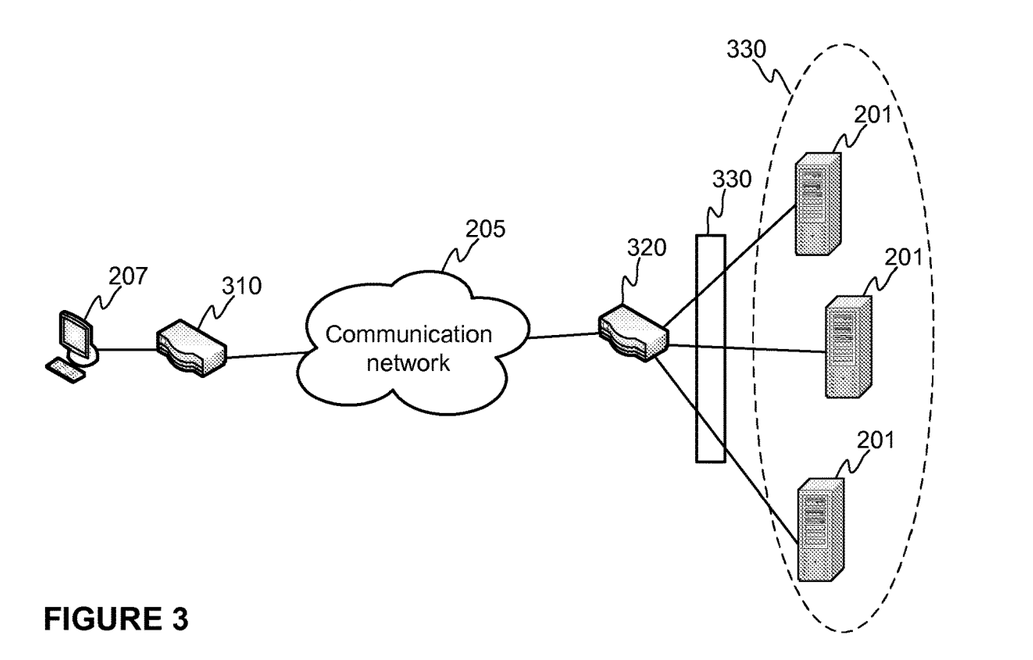

FIG. 3 illustrates schematically a non-limiting example of a communication environment in which an example of the present invention is implemented to. For describing at least some aspects of the present invention the communication environment comprises a service entity 330 implementing a service, which is at least in part accessible through a communication network 205. The communication network 205 may e.g. refer to a packet based network implementing pre-defined communication protocol for enabling the communication between two entities. The service entity 330 may comprise one or more computing devices implementing at least part of the service in question. For the purpose of describing the invention it is assumed that one computing device, referred as a host server 201, is configured to host the service. However, the present invention is not anyhow limited to a solution in which only one computing device is configured to hosting the service, but any kind of distributed service hosting arrangement between a plurality of computing devices is also possible. The host servers 201 may be coupled to the communication network 205 via a router 320. Further, the communication environment according to the non-limiting example comprises at least one source computer 207 from which a Denial-of-Service, DoS, attacks are originating for the purpose of describing the invention. The at least one source computer 207 may also be coupled to the communication network 205 via a router 310. The term "source computer" 207 shall be understood to cover any computing device, or a plurality of computing devices, by means of which the DoS attack may be initiated against the host server 201 over the communication network 205. The routers 310, 320 may refer to devices, which are at least configured to forward data packets between other routers, and thus the communicating entities, over the communication network 205. In other words, the routers 310, 320 are configured to perform tasks for directing data traffic between the entities. A non-limiting example of a communication protocol applicable in the communication environment as shown in FIG. 3 may be TCP/IP protocol or UDP/IP protocol, for example.

At least some aspects of the present invention relate to a solution for defending at least in part against a DoS attack performed by the at least one source computer 207 against the at least one host server 201 over the communication network 205. For describing the solution according to the invention a network device 330 is introduced which may be configured to perform function as will be described in order to defend against the DoS attack. The network device 330 may be considered as a stand-alone device coupled to the communication environment so that the data traffic may go through it or it may be configured to monitor the data traffic outside the communication channel from so called mirror port. A functionality of the network device 330 according to the invention may also be implemented in at least one other entity in the communication channel, such as in the router 320, in a switch, in a blade server, in a packet flow switch/broker, in the firewall or even in the host server 201. Hence, the implementation of the present invention is not limited to the implementation shown in FIG. 3 in which the functionality for defending at least in part against the DoS attack is implemented in the stand-alone network device 330.

Figure 4:
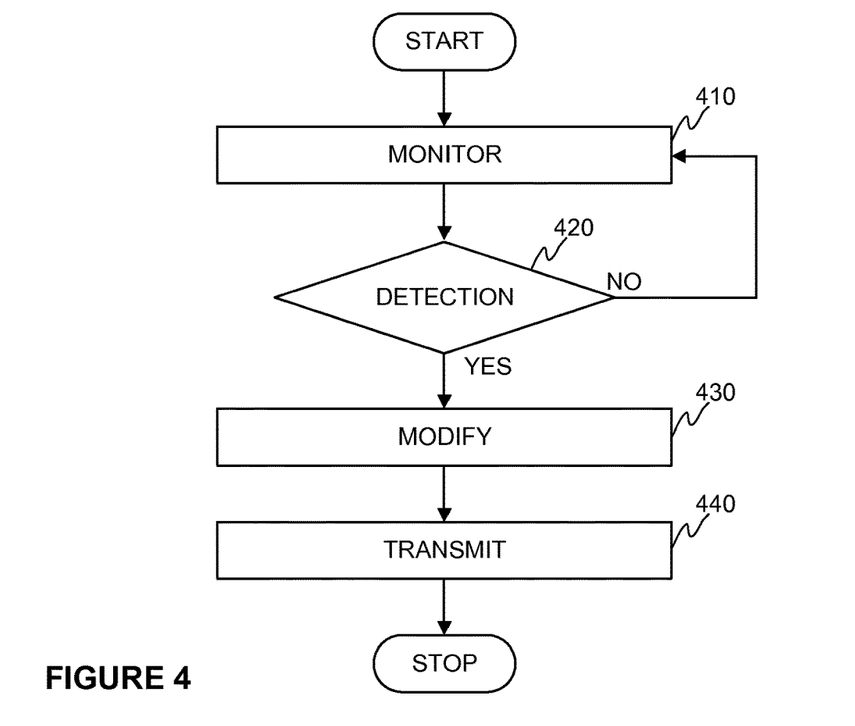
FIG. 4 illustrates schematically a method according to an embodiment of the invention.

Next at least some aspects of the functionality for defending against the DoS attack according to the present invention are discussed by referring to FIG. 4 describing at least some steps of the method according to the present invention.

Regarding step 410:

In step 410 the network device 330 according to an embodiment of the invention is coupled to a communication channel wherein the host server 201 may be an end-device of the communication. As shown in FIG. 3 the network device 330 may reside, and at least the functionality of it may be implemented, between the router 320 and the host server 201 e.g. on Layer 2 (L2) (switched) or on Layer 3 (L3) (routed) environment. The network device is configured to monitor data traffic transmitted to the host server 201 over the communication network 205. The network device 330 may e.g. be configured to monitor the data traffic by determining at least some predetermined parameters representing necessary aspects of the data traffic. Some non-limiting parameters which may be determined either alone or in any combination may e.g. be a utilization rate of the data connection, or the data channel, (e.g. 90-100%) or transferred packets per second, one directional data traffic, only one IP destination or just few IP destinations in the data packets, an amount of TCP traffic packets, an amount of UDP traffic packets, an amount of ICMP traffic packets, an amount of DNS traffic packets, a destination and a source UDP/TCP port numbers, an amount of TCP SYN frames packets, an amount of several communication protocols (like HTTPS, SSL, TLS and HTTP) packets. Further parameters, which may be determined from the data traffic, may be brought out in the discussion of the step 420 below.

Regarding step 420:

The network device 330 may be configured to detect that at least one source computer 207 is generating data traffic, which is related to a Denial of Service attack against the entity, such as the host server 201, the network device 330 is arranged to defend. The detection may be based on a procedure that the network device 330 obtains some predetermined pieces of information from the data traffic during the monitoring step 410 and is configured to compare the obtained pieces of information to corresponding comparison values and if they deviate over a predetermined limit the network node 330 may be configured to conclude that the data packets, and thus the data traffic, relate to a DoS attack. An example of this kind of arrangement may e.g. be that there is defined that from a certain source network address, such as from a source IP address, it may be received a predetermined amount of data packets within a certain time frame. The network device 330 may be configured to monitor this and maintain statistics on the source network addresses from which data traffic is received and the amount of it per the source network address. In case the network device 330 detects that it has received data traffic exceeding a predetermined limit from a certain source network address it may be configured to generate detection on the DoS attack.

It is possible to define a plurality of limits, i.e. rules, on the basis of which the network device 330 may generate detection on the DoS attack. The predetermined rules may be stored in data storage accessible by the network device 330, which rules may be obtained by a processing unit of the network device 330 for executing the monitoring and the detection as described.

The rules may, for example, define that if a predetermined number, such as all, of active and legitimate (i.e. not involved in the DoS attack) data connections, such as TCP connections, get closed, i.e. inactivated, within a predetermined period of time, such as in 30-60 seconds, it may be concluded that a DoS attack is underway. This kind of phenomenon happens because the communication channel mainly, or as a whole, consist of DoS related traffic and the load in the channel is extremely high, and TCP procedures of the system tries to reset the traffic by closing TCP connections. The detection may also be based on detection that a utilization rate of the data connection, or the data channel, exceeds a certain limit. Alternatively or in addition, the detection of the DoS attack may be based to monitoring of communication protocols and TCP/UDP ports, such as TCP, UDP, DNS, ICMP, HTTP, HTTPs, SSL, TLS, TCP SYN, and additionally some other IP protocol types which are typically utilized in the DoS attacks. If these exist in the IP network used for the data traffic, the detection may be based on these. A further solution for detecting the DoS attack may be based on a monitoring of a direction of the data traffic and/or destination(s) of the data traffic. For example, if it is detected that the data traffic is directed to one direction only and to only one IP destination, it may be concluded that DoS attack is underway. Alternatively, the detection may be based on detection that one IP destination receives data traffic from a plurality of IP sources. Furthermore, in some embodiment it is also possible to monitor source IP addresses in the data frames and to analyze if the IP addresses are correct ones or masqueraded, i.e. spoofed, IP addresses, which are not in use at all. This kind of monitoring may be based on a utilization of a certain communication protocol procedure, such as ICMP, SNMP, HTTP, TCP SYN. If the source IP address in question operates properly, i.e. follows the protocol procedure as expected, it may be concluded that it does not belong to a hostile entity, such as to a BOT network, whose clients are searched for and revealed with the solution according to the invention.

In case no detection 420, e.g. on the basis of the above described rules, is done the network device 330 continues the monitoring 410.

Regarding step 430:

At some point of time it may turn out that the network device 330 performs the detection 420 and may be configured to initiate a number of procedures in order to defend the host server 201 against the detected DoS attack. At least one such procedure may be a modification 430 of information received in the data traffic from the source computer 207. The modification 430 of information may be performed so that at least some pieces of information in at least one data frame obtained from the data traffic received from the at least one source computer 207 being involved in the Denial of Service attack is modified so that a modified data frame is generated, i.e. re-generated, and returned to the source computer 207 which causes the source computer 207 to suspend, or at least suppress, the DoS attack from active source computer 207 and not spoofed computers. More specifically, according to an embodiment of the invention the data frame may be modified so that when the data frame is returned to the source computer 207 the source computer 207 cannot return any information from the modified data frame, just suspend and even stop itself and weakening the DoS attack, as will be described. This may be achieved by modifying of data in a plurality of data fields in the data frame so that the source computer 207 receives data frame having modified pieces of information which causes the source computer 207 functioning in a way which suspends, or at least suppresses, the DoS attack. The plurality of data fields into which the modification is performed may at least be the Destination MAC address and the Destination IP address, for instance. The modification shall be understood so that the modified data fields are included with content being contrary to the content according to the specification of the communication protocol In FIG. 5A, in FIG. 5B and in FIG. 5C it is illustrated examples of content included in a certain data fields of data frame. The data frames shown represent data frames in a specific network environment implementations, as will be discussed below. The column "Received frame" discloses the data values of the data frame received by the network device 330. The column "Normal frame to be returned" illustrates, for comparison purposes, the data values of the data frame if the data values of the received frame are modified according to TCP specification, whereas the column "Modified frame" discloses the data values of the data frame modified according to some embodiments which is to be returned by the network device 330. As may be seen the content of certain data fields representing information necessary for transmitting the data frames, i.e. address related information, are in the received frames of FIGS. 5A-5C the same and the content follows the content according to the specification of the TCP connection. For sake of clarity the content of the data fields, i.e. address fields, in the received frame by the network device 330 are the following:

Source MAC address=Router 320 MAC address
Destination MAC address=Host server 201 MAC address
Source IP address=Source computer 207 IP address
Destination IP address=Host server 201 IP address
Source Port Identifier=Source computer 207 Port identifier
Destination Port Identifier=Host server 201 Port identifier Moreover, FIG. 5A schematically illustrates modifications to be performed in L3 routed network implementation. FIG. 5B, in turn, schematically illustrates modifications to be performed in L2 switched implementation. Further, FIG. 5C schematically illustrates modifications to be performed in L2 mirrored network implementation.

Now, the modification operation of the received data frame is now discussed by referring to FIGS. 5A-5C. As said FIG. 5A, as well as FIGS. 5B and 5C, illustrates schematically at least some fields defined in each data frame, such as source and destination MAC addresses, source and destination IP addresses and source and destination Port identifiers. The source and destination MAC addresses represent device-specific addresses of the devices being involved in the communication. For example, the MAC addresses may be the device addresses of the routers residing at both ends of the communication, as e.g. shown in FIG. 3. The source and destination IP addresses, in turn, may refer to network addresses of those entities, which are the communicating parties, such as the source computer 207 and the host server 201. Further, the source and the destination port identifiers may refer to local end point specific identifiers of the source and destination i.e. the port identifier of the source computer 207 and the port identifier of the host server 201, for example.

Referring to FIG. 5A in which the modification is shown in a network environment implementing L3 routed protocol the network device 330 may be configured to modify at least the Source MAC address, Source IP address field and the Source Port identifier field of at least one received frame considered to relate to DoS attack (the modified fields marked with bold in FIG. 5A in the column "Modified frame"). According to the embodiment the Source MAC address field value is set to correspond to Router 320 MAC address (cf. to Host server 201 MAC address in normal frame to be returned), the Source IP address field value is set to correspond to Source computer 207 IP address (cf. to Host server 201 IP address in normal frame to be returned) and the Source Port identifier field value is set to correspond to Source computer 207 Port identifier (cf. to Host server 201 Port identifier in normal frame to be returned). In other words, the data values of the mentioned data fields are modified so that the values deviate from standard values of the mentioned fields. In other words, the network device 330 may be configured to obtain the IP address of the source computer 207 from at least one data frame received from the source computer 207 and input that to the mentioned field in the modified data frame. Similar operation is performed with respect to Source Port identifier. The data value for the Source MAC address field is also obtained from the received frame and in this respect the modification means that value is maintained the same as the value was in the received frame. The values of other data fields may be defined by the network device 330 or stored in a memory accessible by the network device 330. The remaining data fields, i.e. not the ones mentioned above, may comprise any data value as long as they do not prevent the transmission of the data frame through the communication channel with the communication protocol in use, and may be set by the network device 330 with any described mechanism. As may be seen the modified frame does not comprise any information which links it to the host server 201.

Referring to FIG. 5B, in turn, in which the modification is shown in a network environment implementing L2 switched protocol the network device 330 may be configured to modify at least the Source IP address field and Source Port identifier of at least one received frame considered to relate to DoS attack (the modified fields marked with bold). According to the embodiment the Source IP address field value is set to correspond to source computer 207 IP address and Source Port identifier field value is set to correspond to source computer 207 port identifier. These values again deviate from a standard way of modifying the mentioned fields, because normally the field values were host server 201 IP address and host server 201 port identifier, correspondingly. The mentioned values may e.g. be obtained from the received data frame, or at least some of them and the others may be defined by the network device 330 or stored in a memory accessible by the network device 330. The remaining data fields may comprise any data value as long as they do not prevent the transmission of the data frame through the communication channel with the communication protocol in use, and may be set by the network device 330 with any described mechanism.

Further, referring to FIG. 5C in which the modification is shown in a network environment implementing L2 mirrored protocol the network device 330 may be configured to modify at least the Source MAC address field, the Source IP address field and the Source Port identifier field of at least one received frame considered to relate to DoS attack (the modified fields marked with bold in FIG. 5C in the column "Modified frame"). According to the embodiment the Source MAC address field value is set to a unique MAC address which is new and does not correspond to MAC address of the host server 201. Moreover, the Source IP address field value is set to correspond to source computer 207 IP address and the Source Port identifier field value is set to correspond to Source computer 207 port identifier. Again, the values deviate from a standard way of modifying the mentioned fields, as may be seen from FIG. 5C by comparing the field values between the column "Normal frame to be returned" and the column "Modified frame". The mentioned values may e.g. be obtained from the received data frame, or at least some of them and the others may be defined by the network device 330 or stored in a memory accessible by the network device 330. The remaining data fields may comprise any data value as long as they do not prevent the transmission of the data frame through the communication channel with the communication protocol in use, and may be set by the network device 330 with any described mechanism.

In some embodiment, such as together with the above described communication environments, the network device 330 may be configured to enhance the operation against the DoS attack by using sequence number field (SEQ) in a similar way as the other fields described above. As is known SEQ identifies a byte in the stream of data and is used for acknowledging the amount of data received and for each communicating party an own SEQ is maintained. According to some embodiment the SEQ field in the modified frame is set so that the SEQ value is set to correspond to the original SEQ number of the source computer 207 as in the received frame. Further, the SEQ value for the destination, i.e. the host server 201 is also set to correspond to the original SEQ number of the source computer 207. In other words, the modified frame does not provide any information on the SEQ value of the destination party, i.e. the host server 201. This also emphasizes the effect of the returned modified data frame to the source computer 207.

The same approach may be applied by modifying an acknowledgement number (ACK) in the data frame. The acknowledgement number defines the next sequence number that the sender of the acknowledgement expects to receive. By modifying the data frame to be returned so that the acknowledgement number for the modified frame is obtained from the received data frame and it corresponds to the acknowledgement number of the source computer 207. This, again, enhances the operation against the DoS attack.

In other words, the above described modification generates at least one modified data frame in which at least some data fields comprise modified data values as described. In addition, an enhancement of the operation may be achieved by modifying the sequence number and acknowledgement number fields, as described.

As described under step 430 the modified fields shall be chosen with respect to a communication environment applied for the communication and the values of some fields in the data frame are dependent on the implementation of the network environment. For example, if the network environment implements L3 routed addressing, the network address of the destination party and the destination device-specific address are valid. According to an embodiment the defend may be achieved by defining the network address value of the source to correspond to the source computer 207 network address and the source device-specific address value to correspond to the device-specific address of the local routing device 320 at the host server end as well as the local end point specific identifier value to correspond the local end point specific identifier of the source computer 207. On the other hand, if the network environment implements so called L2 switched addressing the modified data frame shall define that the network address value of the source corresponds to source computer 207 network address and the local end point specific identifier value corresponds to the local end point specific identifier of the source computer 207. Still further, if the network environment implements so called L2 mirrored addressing the modified data frame shall define that the destination device-specific address value to correspond to a unique device-specific address, which is not the device-specific address of the host server. Additionally, network address value of the source corresponds to source computer 207 network address and the local end point specific identifier value corresponds to the local end point specific identifier of the source computer 207. In this manner the local L2 based switch does not disturb (as a flood) the network and/or operation of L2 in general. In practice, it is possible to utilize packet transfer systems comprising so called L2-PFS (Packet Flow Switches or Brokers) together with the described network addressing options (L3 routed, L2 switched, L2 mirrored). This is especially true in L2 based network environment wherein it is possible to switch from L2 directly to L3 interface wherein there is no need to consider any limitations originating from L2 addressing.

Summarizing the description of the embodiments above it may be said that in order to achieve the desired effect against the DoS attack the data values of the field marked as bold in FIGS. 5A-5C must in minimum be modified as described in different. The remaining field in each communication environment may also be modified, because the source computer 207 cannot return any information of the host server 201 for continuing the DoS attack from the modified data frame. As said the protocol fields, such as IP and UDP/TCP header checksum values), j in the modified frame shall be valid so that the communication between the entities may succeed according to the communication protocol standard.

It is also worthwhile to mention that in at least some embodiment the modified frame may contain any source network address, such as even a spoofed IP address. Moreover, the modified frame may comprise port identifiers and SEQ counter values, which may be incorrect on purpose in the network environments in which L3 routed, L2 switched or L2 mirrored addressing is in use. Further, in L2 network environment it is also possible to apply spoofed source device-specific addresses as long as they are unique device-specific addresses (MAC) and do not disturb (as a flood) an operation of L2 switch and do not correspond to the device-specific address of the host server 201.

Regarding step 440:

In response to completing the modification step 430 the network device 330 may be configured to transmit the at least one generated data frame, i.e. the modified data frame, to the source computer 207. The routers 310, 320 in the communication channel are configured to obtain the necessary addresses defined in the data frame and direct the traffic accordingly. As the destination and source IP addresses, i.e. the network-layer address, address to the source computer 207 the routers forward the at least one data frame back to the source computer 207.

In response to a receipt of the generated modified data frame the source computer 207 tries to follow the operation according to the communication protocol in use. In case of TCP/IP protocol, or UDP/IP protocol, the source computer 207 attempts to return the data frame, or frames, back to sender, i.e. the host server 201, but due to value defined especially in the source IP address field in the received modified data frame the source computer 207 is not able to find anything else but its own network address. Hence, it turns out to be impossible to transmit, or to return, any data frames back to the host server 201 and in that manner to suspend and reveal the DoS attack. Similarly, as the value of the source port identifier corresponds to the source computer port identifier value the source computer cannot find any transmission address, i.e. return address, on TCP/UDP port layer. Moreover, if the modification, as described above, is also performed to MAC address fields, such as in L3 (routed) network, both the source computer 207 and the host server 201 exchange IP/MAC information with the router closest to the mentioned entity. For this purpose so called address resolution protocol (ARP) is used. In such an implementation each device, i.e. the source computer 207, the router 310, the router 320 and the host server 201, maintain address information in their own data tables (ARP cache), which information indicates which IP/MAC address pairs belong together. As the destination and source IP addresses correspond to the source computer 207 IP address and the destination and source MAC address correspond to router 320 MAC addresses the source computer 207 and router 320 cannot continue disturbing the network and the host server 201 within the DoS attack because it cannot return and get any information on the host server 201 from the modified data frame returned to it by the network device 330. As mentioned, if the network device 330 sits on L2 (switched) network, the modification to the MAC addresses is necessary in order to enable the return of the modified data packet and minimizing any disturbance caused by the switched network in which the host server 201 locates.

In other words, the source computer 207 ends up to a situation that when it attempts to recover on the at least one received modified data frame and it attempts to report towards the host server 201, it does not succeed because any destination address obtained from the at least one modified data frame addresses towards itself and any transmission port from the source computer 207 cannot be continued and resend. Or if the source computer somehow manages to transmit something the router 310 at latest returns all data traffic back to the source computer 207 due to the addresses in the data frame received from the source computer 207. This functionality is based on the specification of the TCP/IP protocol family.

Figure 6:
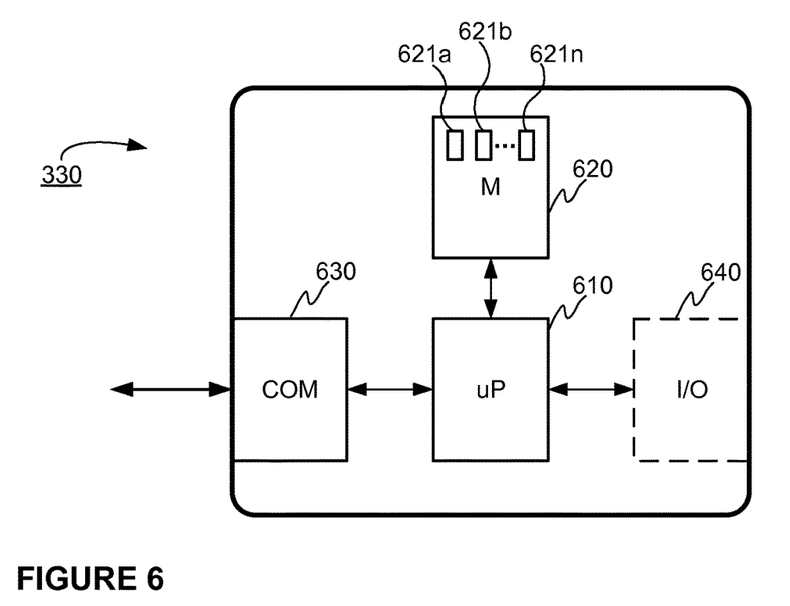
FIG. 6 illustrates schematically a network device according to an example of the invention.

FIG. 6 illustrates schematically a network device 330 according to an example of the invention. The network device 330 may be configured to implement the method for defending against a DoS attack as described at least in part. The execution of the method may be achieved by arranging the processor 610 to execute at least some portion of computer program code 621a-621n stored in a memory 620 causing the processor 610, and, thus, the network device 330, to implement one or more method steps as described. Hence, the processor 610 may be arranged to access the memory 620 and to retrieve and to store any information therefrom and thereto. Moreover, the processor 610 may be configured to control the communication through one or more communication interface 630, such as through a plurality of Local Area Network (LAN) interfaces, with any external unit or a plurality of units, such as with at least one of the following: a L2 switch, a blade server, a router 320, a host server 201. Hence, the communication interface 630 may be arranged to implement, possibly under control of the processor 610, a corresponding communication protocol in question. Further, the network device 330 may comprise one or more input/output devices 640 for inputting and outputting information. Such input/output devices may e.g. be keyboard, buttons, touch screen, display, loudspeaker and so on. In some implementation of the network device 330 at least some of the input/output devices may be external to network device 330 and coupled to it either wirelessly or in a wired manner. For sake of clarity, the processor herein refers to any unit or a plurality of units suitable for processing information and control the operation of the network device 330 in general at least in part, among other tasks. The mentioned operations may e.g. be implemented with a microcontroller solution with embedded software. Similarly, the invention is not limited to a certain type of memory only, but any memory unit or a plurality of memory units suitable for storing the described pieces of information, such as portions of computer program code and/or parameters usable in the context of the present method, may be applied in the context of the present invention. Even if it is disclosed that the method may be implemented with one network device 330, it may also be arranged that implementation of the method is performed in multiple network devices 330 operatively coupled to each other either directly or indirectly as a distributed implementation. In case the network device 330 is integrated with to another network entity the functionality of the network device 330 is advantageously implemented in the manner as described.

At least some aspects of the present invention are described herein by referring to a communication environment of FIG. 3 in which a TCP/IP or a UDP/IP protocol is used. However, the invention is not limited to the mentioned protocols only, but any other communication protocol may be used as long as the communication protocol may carry data in data packets and in which a source entity and a destination entity related information, as described is derivable and modifiable in the manner as described. Especially as already described the invention is applicable when there exists an active TCP or UDP connection which is based on the acknowledging the received packets in the manner as described. Moreover, the data traffic may advantageously be analyzed so that it is possible to conclude, e.g. with respect to one or more predetermined rules, if the data traffic in question relates to DoS attack or not at least at some probability.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for defending against a Denial of Service attack, the method comprises:
monitoring data traffic transmitted from at least one source computer to a host server,
detecting that the at least one source computer transmitting data is involved in a Denial of Service attack,
in response to the detection that the at least one source computer is involved in the Denial of Service attack generating at least one data frame by modifying at least one data frame obtained from the data traffic transmitted from the at least one source computer being involved in the Denial of Service attack so that a plurality of data fields comprising at least the following: a source network address and local end point specific identifier of the source in the generated at least one data frame representing address information of the host server as a source of the at least one generated data frame are set to correspond to address information of the at least one source computer being involved in the Denial of Service attack so that a data field representing a device-specific address of the source, the data field is set to correspond to one of the following: a device-specific address of a routing device receiving the data traffic from the at least one source computer; a unique device-specific address deviating from a device-specific address of the host server,
transmitting the generated data frame to the source computer.

2. The method of claim 1, wherein the generation of the at least one data frame further comprises a modification of a sequence number of a source sequence number to correspond to a received sequence number obtained from the data frame obtained from the data traffic.

3. The method of claim 1 wherein the generation of the at least one data frame further comprises a modification of an acknowledgement number of a source acknowledgement number to correspond to a received acknowledgement number obtained from the data frame obtained from the data traffic.

4. The method of claim 1, wherein the detection that the at least one source computer transmitting data is involved in a Denial of Service attack is based on at least one predetermined rule.

5. The method of claim 4, wherein the at least one predetermined rule is based on at least one of the following: utilization rate of a data connection, inactivation of data connection within a predetermined period of time, a direction of the data traffic, a number of destinations of the data traffic, detection of used protocols and TCP/UDP port numbers in the data traffic.

6. A network device for defending against a Denial of Service attack, the network device comprises:
at least one processor;
at least one memory including computer program code;
the at least one memory and the computer program code configured to, with the at least one processor, cause the network device to perform:
monitor data traffic transmitted from at least one source computer to a host server,
detect that the at least one source computer transmitting data is involved in a Denial of Service attack,
in response to the detection that the at least one source computer is involved in the Denial of Service attack generate at least one data frame by modifying at least one data frame obtained from the data traffic transmitted from the at least one source computer being involved in the Denial of Service attack so that a plurality of data fields comprising at least the following: a source network address and local end point specific identifier of the source in the generated at least one data frame representing address information of the host server as a source of the at least one generated data frame are set to correspond to address information of the at least one source computer being involved in the Denial of Service attack so that a data field representing a device-specific address of the source, the data field is set to correspond to one of the following: a device-specific address of a routing device receiving the data traffic from the at least one source computer; a unique device-specific address deviating from a device-specific address of the host server,
transmit the generated data frame to the source computer.

7. The network device of claim 6, wherein the network device is further configured to modify a sequence number of a source sequence number to correspond to a received sequence number obtained from the data frame obtained from the data traffic during the generation of the at least one data frame.

8. The network device of claim 6, wherein the network device is further configured to modify an acknowledgement number of a source acknowledgement number to correspond to a received acknowledgement number obtained from the data frame obtained from the data traffic during the generation of the at least one data frame.

9. The network device of claim 6, wherein the network device is configured to perform the detection that the at least one source computer transmitting data is involved in a Denial of Service attack based on at least one predetermined rule.

10. The network device of claim 9, wherein the network device is configured to base the at least one predetermined rule on at least one of the following: utilization rate of a data connection, inactivation of data connection within a predetermined period of time, a direction of the data traffic, a number of destinations of the data traffic, detection of used protocols and TCP/UDP port numbers in the data traffic.

11. A computer program product comprising at least one non-transitory computer-readable storage medium having computer-executable program code instructions stored therein, the program code instructions being configured, when the computer program product is executed on a computer, to cause the computer to at least:
monitor data traffic transmitted from at least one source computer to a host server,
detect that the at least one source computer transmitting data is involved in a Denial of Service attack,
in response to the detection that the at least one source computer is involved in the Denial of Service attack, generate at least one data frame by modifying at least one data frame obtained from the data traffic transmitted from the at least one source computer being involved in the Denial of Service attack so that a plurality of data fields comprising at least the following: a source network address and local end point specific identifier of the source in the generated at least one data frame representing address information of the host server as a source of the at least one generated data frame are set to correspond to address information of the at least one source computer being involved in the Denial of Service attack so that a data field representing a device-specific address of the source, the data field is set to correspond to one of the following: a device-specific address of a routing device receiving the data traffic from the at least one source computer; a unique device-specific address deviating from a device-specific address of the host server, and
transmit the generated data frame to the source computer.

* * * * *